Feb. 19, 1957 D. MANNHEIMER 2,782,356
MOTOR CONTROL SYSTEM
Filed Sept. 15, 1955
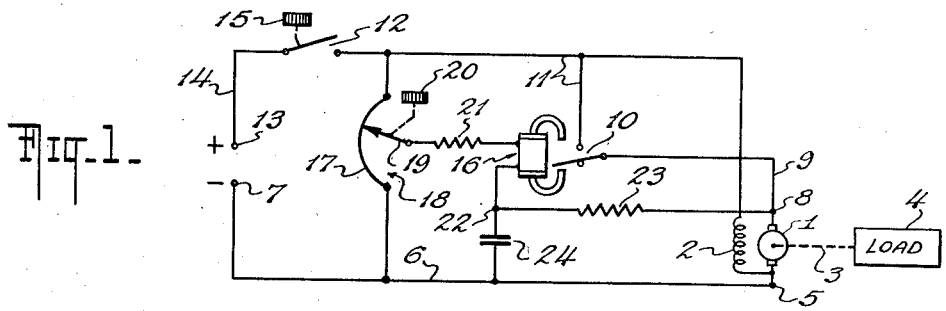
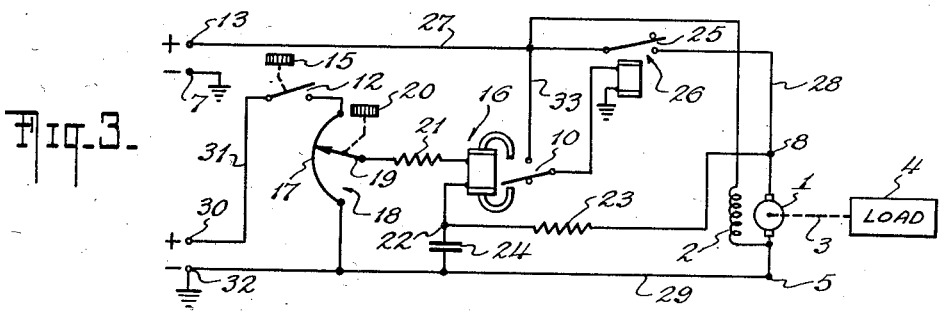
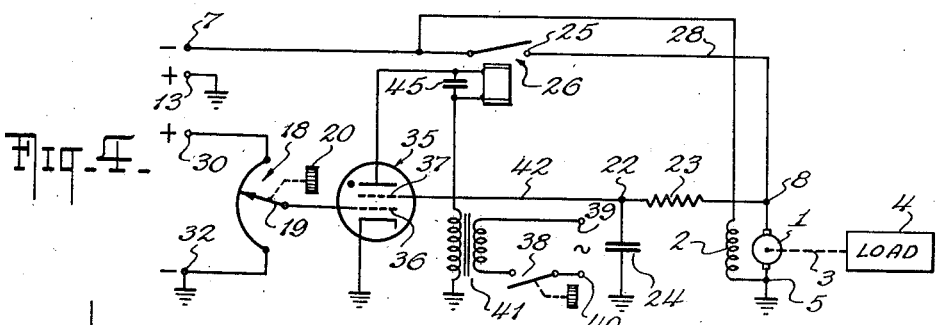
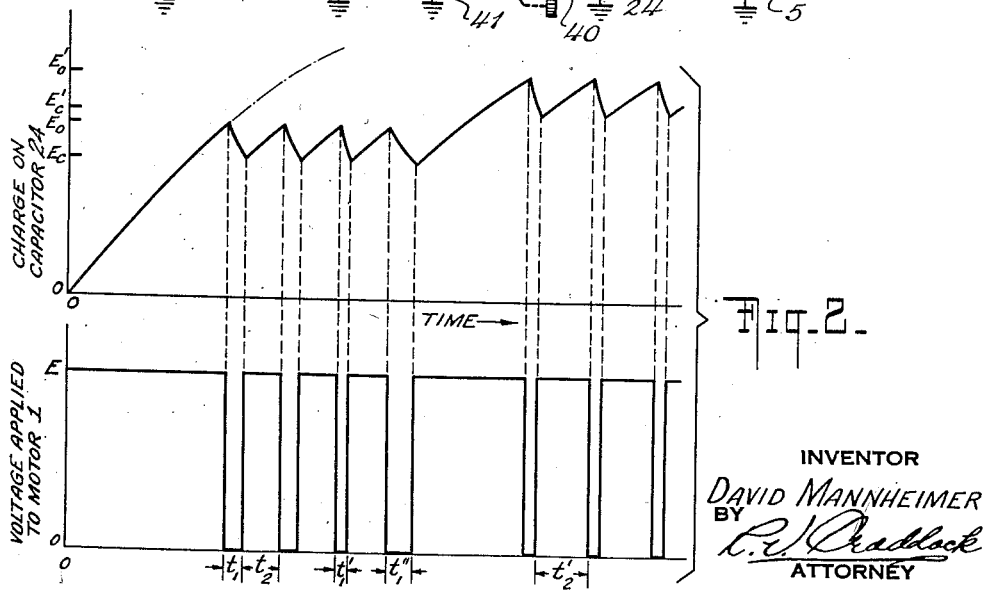
INVENTOR
DAVID MANNHEIMER
BY
ATTORNEY United States Patent Office 2,782,356
Patented Feb. 19, 1957

2,782,356

MOTOR CONTROL SYSTEM

David Mannheimer, West Hempstead, N. Y., assignor to Sperry Rand Corporation, a corporation of Delaware Application September 15, 1955, Serial No. 534,487

8 Claims. (Cl. 318—331)

This invention relates generally to improvements in motor control systems. More particularly, the invention concerns a novel arrangement for selectively adjusting the speed of a D. C. motor from standstill to full speed while automatically maintaining the speed of the motor at the value selected irrespective of magnitude variations that may occur in the load to which the motor is drivably coupled.

The simplest and most familiar arrangement for producing deliberate changes in the speed of a shunt or compound type of D. C. motor requires a variable resistance to be inserted in series with the shunt field. However, the variations in speed which can be produced by this method are severely limited and merely range from the normal speed up to the highest safe operating speed.

Another method makes use of a variable resistance connected in series with the motor armature and having sufficient current capacity to carry the armature current for long intervals without overheating. The speed variation which can be secured by varying the armature resistance ranges from normal speed down to standstill. However, the use of this method to obtain low speeds has the disadvantages of considerable power loss in the resistance, poor motor speed regulation under varying load conditions, and undesirable bulkiness in the resistance itself.

Besides the foregoing, there are several systems for controlling motor speed by applying different armature voltages which are varied at their source, such as by the use of three-wire generators or two-wire generators with balancer sets or by the Ward-Leonard system. This latter system, which has been the most practicable and which provides a low impedance source, consists of a constant-speed motor driving a generator of variable field excitation that supplies current to the motor whose speed is to be adjusted. However, in view of providing three full-sized machines instead of one to perform the work, the cost of the Ward-Leonard system is often prohibitive.

The principal object of the present invention is to provide a novel arrangement of high efficiency for selectively adjusting the speed of a D. C. motor from standstill to full speed while automatically maintaining the speed of the motor at the value selected irrespective of magnitude variations that may occur in the load to which the motor is drivably coupled.

Another object is the provision of a low impedance source of energizing voltage for a D. C. motor drivably coupled to a load, which source adjusts automatically in response to variations in the load so as to maintain the speed of the motor at a selected value.

Another object is to provide an improved contactor arrangement for supplying rectangular pulses of actuating power to a D. C. motor wherein the duty cycle of the contactor, hence the average power supplied to the motor, is readily adjustable by an operator to vary the speed of the motor from standstill to full speed and wherein the duty cycle is also self-adjusting to maintain whatever speed is selected by the operator irrespective of changes in the load driven by the motor.

Another object is the provision of a charging circuit across the armature of a D. C. motor, which circuit is arranged to cut off the power supplied to the motor upon attaining a predetermined charge from the motor's power supply, thereupon to discharge through the armature at a rate dependent upon the counter-E. M. F. of the motor until the charging circuit reaches a lesser predetermined charge, thereupon to reconnect the power to the motor, and so on.

With the foregoing and other objects in view, the present invention includes the novel combinations and elements described below and illustrated in the accompanying figures, wherein, Fig. 1 is a schematic diagram of a preferred embodiment of the present invention;

Fig. 2 is a graphical representation of the behavior of the arrangement of Fig. 1; and Figs. 3 and 4 are schematic diagrams of other embodiments of the present invention.

Referring to Fig. 1, a D. C. motor 1 is connected by a mechanical coupling 3 to drive a load device 4. One armature terminal 5 of the motor is connected via a lead 6 to one terminal 7 of a well-regulated power source of fixed magnitude D. C. voltage. The other armature terminal 8 is connected by a lead 9 to a single-pole single-throw switch 10, the closing of which connects lead 9 to a lead 11 connected to a single-pole single-throw switch 12, the closing of which connects lead 11 to the other power terminal 13 via a lead 14. Thus, when switches 10 and 12 are both closed, motor terminal 8 is connected via leads 9, 11, 14 to power terminal 13, thereby to place the power source across the motor armature. Motor 1 is provided with a shunt field winding on each pole, schematically indicated by winding 2 connected from lead 11 to motor terminal 5. Switch 12 may be manually actuated by a knob 15, while switch 10 forms the contactor portion of a sensitive polarized relay 16 and is closed when the relay is sufficiently energized by a direct current of given polarity.

The winding 17 of a potentiometer 18 is connected at one end thereof (upper end as viewed in Fig. 1) to lead 11 between switches 10, 12 and at the other end thereof to lead 6. Thus, when switch 12 is closed, power terminals 7, 13 are thereby connected across winding 17. The wiper 19 of potentiometer 18 may be actuated manually by an adjustment knob 20, and is electrically connected in series with a fixed resistor 21 and the winding of sensitive polarized relay 16 to a current dividing terminal 22. A resistor 23 is connected from terminal 22 to motor terminal 8, and a capacitor 24 is connected from terminal 22 to motor terminal 5 by way of lead 6.

When potentiometer winding 17 is connected across power terminals 7, 13 by the closing of switch 12, and when wiper 19 is at a position other than its lowermost position as viewed in Fig. 1, a direct current is caused to flow through the winding of relay 16 in the relay's actuating sense. This current is more than enough to actuate the relay, its magnitude being large since the motor can not build up a substantial counter-E. M. F. instantaneously and therefore initially provides a low impedance path for the relay winding current. Hence, the closing of switch 12 is accompanied by a substantially simultaneous closing of relay switch 10. Condenser 24 charges principally through resistor 23, this resistor being of somewhat lower value than resistor 21 which is provided for isolation purposes, i. e. to unload capacitor 24 and resistor 23. And as the speed and counter-E. M. F. of motor 1 build up, so does the charge on capacitor 24.

After a brief interval of time, the potential difference across the winding of relay 16 is lowered sufficiently by the charge building up on capacitor 24 to de-actuate the relay and thereby open switch 10 to disconnect the motor armature from its direct connection across power terminals 7, 13. Capacitor 24 then begins to discharge through motor 1 at a rate governed by the rate of decay of the motor's counter-E. M. F. By virtue of its sensitivity, which is preferably high, relay 16 is re-actuated before capacitor 24 fully discharges, i. e., when the potential difference across the winding of relay 16 is increased by such discharge by but a small amount, since the potential difference needed to actuate the relay is only slightly higher than the potential difference at which the relay contacts open. With the reactuation of relay 16, power is again supplied to motor 1, and capacitor 24 increases in charge until it causes switch 10 to open, whereupon capacitor discharge and relay reactuation again take place, and so on.

In Fig. 2, the charge variations for capacitor 24 (Fig. 1) and the voltage supplied to motor 1 are plotted against time. Before knob 15 is actuated to close switch 12, the charge on capacitor 24 is zero. The plots of Fig. 2, therefore, begin with the closing of switch 12. It will be observed that following this event, the charge on capacitor 24 builds up gradually, and at the same time, full voltage E is supplied to motor 1 since relay switch 10 is closed substantially simultaneously with switch 12. When the charge reaches a preselected peak value $E_o$, determined by the setting of wiper 19, the relay switch 10 opens, whereby power is removed from motor 1 and capacitor 24 discharges gradually to a value $E_c$ at which relay switch 10 again closes. The charge on capacitor 24 again builds up to $E_o$, discharges to $E_c$, builds up to $E_o$, discharges to $E_c$, and so on. The capacitor's discharge time, hence the time that power is switched off from motor 1, is represented in Fig. 2 as $t_1$, while the capacitor's steady state charging time, hence the time that power is switched on to motor 1, is represented as $t_2$.

The duty cycle $$\frac{t_2}{t_1+t_2}$$

hence the average power supplied to motor 1, will change if either $t_2$ or $t_1$ changes. A change in $t_1$ results from a change in load 4 (Fig. 1). That is to say, as the load increases, the increased rate of decay of the motor's counter-E. M. F. brings about an increased rate of discharge of capacitor 24 and, consequently, a decrease in $t_1$ to a lesser value $t_1'$ thereby increasing the duty cycle and the average power supplied to motor 1. Conversely, as the load decreases, the decreased rate of decay of the counter-E. M. F. brings about a decreased rate of discharge of capacitor 24 and, consequently, an increase in $t_1$ to a greater value $t_1''$ thereby lowering the duty cycle and the average power supplied to the motor. Thus it will be apparent that the duty cycle of the system automatically adjusts itself to the load, so that the average power supplied to motor 1 increases for load increases and decreases for load decreases, whereby to closely maintain the speed of the motor constant notwithstanding load variation.

As previously stated, besides changing with load induced changes in $t_1$, the duty cycle of the system will change if $t_2$ changes. A change in $t_2$ results from adjustment of potentiometer wiper 19 by knob 20. When wiper 19 is moved upwards across winding 17, as viewed in Fig. 1, a greater charge $E_o'$ on capacitor 24 is required to lower the potential across the polarized winding of relay 16 sufficiently to cause relay switch 10 to open. Then when switch 10 opens, capacitor 24 discharges gradually to a value $E_c'$ at which switch 10 again closes, whereupon the capacitor recharges to $E_o'$, and so on.

It will be noted that the portion of the charging curve of capacitor 24 being operated upon for the new setting of wiper 19 is flatter in slope than it was for the initial setting of wiper 19. Hence, it requires a steady-state time $t_2'$ greater than $t_2$ for the charge on capacitor 24 to increase from $E_c'$ to $E_o'$. Moreover, the greater charge $E_o'$ attained by capacitor 24 steepens the capacitor's discharge curve due to the increased spread between $E_o'$ and the counter-E. M. F. of motor 1, so that upward movement of wiper 19 not only increases the on time of the system but also decreases the off time. Conversely, if wiper 19 is moved down from its initial position, as viewed in Fig. 1, a steady-state time less than $t_2$ will be required for the charge on capacitor 24 to increase from its switch-closing value to its switch-opening value, since the slope of the portion of the charging curve then being operated upon will be steeper than it was for the initial setting of wiper 19. Further, the discharge curve will be flatter, so that downward movement of wiper 19 not only decreases the on time of the system but also increases the off time. Accordingly, the duty cycle of the system will increase, hence the average power supplied to motor 1 will increase, if wiper 19 is moved upwards on winding 17, while the duty cycle and average power will decrease if wiper 19 is moved downwards. By this arrangement, therefore, the speed of the motor is readily adjusted according to the adjustment given to the knob 20 of potentiometer 18. In fact, as a matter of design, the speed of the motor may be varied continuously with the present system from stand-still to a speed in excess of normal operating speed. Thus, the system of Fig. 1 provides both proportional speed control and also accurate speed regulation in the presence of varying loads.

Fig. 3 depicts a modified arrangement of Fig. 1 wherein sensitive relay 16 is employed to switch power on and off to motor 1 through the switching element 25 of a power relay 26. For this arrangement, the regulated D. C. supply terminal 7 is grounded and terminal 13 is connected via a lead 27 to switch 25, the closing of which by energization of relay 26, connects lead 27 via a lead 28 to armature terminal 7 of motor 1. The other armature terminal 5 of motor 1 is connecter via a lead 29 to ground so that the closing of power relay switch 25 places the regulated D. C. power supply across the motor's armature. Field winding 2 is connected from lead 27 to motor terminal 5 so as to by-pass the switch 25 and thereby maintain an uninterrupted field regardless of interruptions in the armature power supply brought about by the operation of switch 25.

The terminal 30 of a separate source of D. C. potential is connected via a lead 31 to switch 12, the closing of which connects lead 31 to one end of the winding 17 of potentiometer 18. The other end of winding 17 is connected to the grounded lead 29 and the other terminal 32 of the separate D. C. source. Thus when switch 12 is manually closed by its actuating knob 15, potentiometer winding 17 is thereby connected across D. C. terminals 30, 32.

As in Fig. 1, wiper 19 of potentiometer 18 is connected via isolation resistor 21 and the winding of sensitive relay 16 to terminal 22, thence via a resistor 23 to motor terminal 8. Capacitor 24 is connected from terminal 22 to motor terminal 5 by way of lead 29. The closing of relay switch 10 serves to connect a lead 33 from power lead 27 via the winding of power relay 26 to ground, thereby to energize the power relay from power terminals 7, 13.

The arrangement of Fig. 3 is placed into operation by actuating the knob 15 to close switch 12. Assuming wiper 19 to be at a position on potentiometer winding 17 to produce a potential difference across the winding of sensitive relay 16 sufficient to operate the same to close relay switch 10, thereby to energize relay 26, power from terminals 7, 13 is immediately supplied to motor 1. Capacitor 24 charges through resistor 23 until it lowers the potential difference across relay 16 enough to open switch 10, whereupon power relay 26 is de-energized and the power supplied to motor 1 through switch 25 is removed from the motor. Capacitor 24 then discharges through resistor 23 and the motor at a rate determined by the rate of decay of the motor's counter-E. M. F., hence at a rate dependent upon the load 4. When capacitor 24 has discharged enough to raise the potential difference across relay 16 to its pull-in value, relay 16 again operates relay 26 to supply power to the motor.

Thus in Fig. 3, the motor is supplied with rectangular-wave D. C. pulses as in Fig. 1; and the duty cycle of the system, hence the average power supplied to the motor, is again adjusted manually by manipulation of potentiometer adjustment knob 20 and adjusted automatically by variations in load 4.

Fig. 4 illustrates a modification of Fig. 3 wherein a thyratron 35 having two grids 36, 37 is employed in lieu of the sensitive polarized relay 16 for controlling the power relay 26 to switch power on and off to motor 1. The operation of the arrangement of Fig. 4 is essentially the same as that of Fig. 3 inasmuch as capacitor 24 is charged and discharged through resistor 23 to control the on and off times of motor 1.

The variable control voltage of positive polarity on wiper 19 of potentiometer 18 across supply terminals 30, 32 is applied to thyratron grid 36 in an analogous fashion to the application of the controllable potential supplied from wiper 19 via resistor 21 to the winding of sensitive relay 16 in Figs. 1 and 3. A reference source of alternating current is connected, by the closing of a manually-actuated main switch 38, across the terminals 39, 40 of the primary winding of a transformer 41. One side of the secondary winding of transformer 41 is connected to ground and the other side is connected via the winding of power relay 26 to the plate of the thyratron, the cathode of which is grounded. Thus, in the absence of a cut-off negative potential on grid 37, the thyratron will conduct during the half-cycle intervals when its plate is positive and aiding the adjustable positive potential on grid 36.

When the thyratron conducts, power relay 26 is thereby energized to close relay switch 25 to supply D. C. power from terminals 7, 13 to motor 1. In Fig. 4, the negative terminal 7 is connected by switch 25 to motor terminal 8, the positive terminal 13 being connected to motor terminal 5 and ground. Hence, with relay switch 25 and main switch 38 closed, capacitor 24 charges through resistor 23. By virtue of a capacitor 45 connected across the winding of relay 26, relay switch 25 remains closed even when thyratron 35 is extinguished by a negative half-cycle of reference A. C. on its plate. Thus, the negative charge of capacitor 24 is permitted to build up without interruption. A lead 42 from capacitor terminal 22 applies this negative charge potential to grid 37 so that when the charge reaches a given level, thyratron 35 is prevented from firing on positive half-cycles of the reference A. C. The winding capacitor 45 shortly thereafter loses its contact-sustaining charge, and relay switch 25 opens. Capacitor 24 then discharges until the negative potential on grid 37 permits thyratron 35 to fire when its plate goes positive, whereupon capacitor 24 again charges to the thyratron's cut-off potential, then discharges, charges, discharges, and so on in a steady state manner, i. e., always charging and discharging to given respective potentials for a given setting of potentiometer wiper 19.

The steady state charging time, hence the time that power is supplied to motor 1, depends upon the magnitude of the positive potential applied to grid 36 by adjustment of potentiometer wiper 19. That is to say, the more positive that grid 36 is made, the greater the negative potential that is required on grid 37 to keep thyratron 35 extinguished even though its plate goes positive. The steady-state discharging time, hence the time that power is removed from motor 1, depends upon the load 4. As in Figs. 1 and 3, the greater the load, the more rapid the discharge time and the greater the resultant average power supplied to motor 1, whereby a constant speed of motor 1 according to the adjustment of potentiometer wiper 19 is automatically maintained irrespective of load variations.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In a control system for a D. C. motor, a source of actuating potential for said motor, controllable switching means operative in first and second senses respectively to connect and disconnect said actuating source to and from said motor, potential storing means connected across said motor so as to charge from said actuating source when said switching means is operated in said first sense and to discharge through said motor when said switching means is operated in said second sense, and control means responsive to the potential of said storing means for operating said switching means in said first sense until said storing means acquires a first value of charge potential from said actuating source for which event said control means responds to operate said switching means in said second sense and maintain the latter operation until said charge potential diminishes by discharge to a second value lower than said first value and greater than zero whereupon operation of said switching means in said first sense is resumed so that said actuating potential is switched successively on and off to said motor during the respective charging and discharging time intervals of said storing means.

2. A self-monitoring system for controlling the speed of a D. C. motor drivably connected to a load subject to magnitude variation, said system comprising a D. C. power line, voltage storage means of preselected time constant coupled to said motor and power line, and means including a switch in said power line controlled by said storage means to open said line when the charge acquired by said storage means from said line reaches a first value and to reclose said line when said charge diminishes to a second value, said storage means discharging through said motor in opposition to said motor's counter-E. M. F. when said switch is open, the rate of said discharge being governed by the rate of decay of said counter-E. M. F. due to said load, whereby the proportion of time that power is supplied to said motor to the total time between successive closings of said switch may be made to increase in proportion to increases in said load.

3. A control system for a D. C. motor comprising a source of D. C. power connected to said motor for operatively energizing the same, a resistor and capacitor connected in series across said motor, and switching means responsive in a first sense to the acquisition of a predetermined charge potential by said capacitor from said source for disconnecting said source from said motor, thereby also to disconnect said source from said resistor and capacitor so that said capacitor discharges through said resistor and said motor at a rate governed by the rate of decay of the motor's counter-E. M. F., said switching means being responsive in a second sense to the discharge of said capacitor to a lower predetermined charge potential for reconnecting said source to said motor, whereby power to the motor is alternately switched on and off for time intervals according, respectively, to the charging and discharging time intervals of said capacitor.

4. A control system for a D. C. motor comprising a source of D. C. power, a potentiometer connected across said power source, said potentiometer having a slider contact, a resistor and capacitor connected in series across said motor, means connecting one terminal of said power source to the common junction of said capacitor and said motor, and a relay having its control winding connected from said slider contact to the common junction of said resistor and capacitor so as to complete an energizing circuit for said relay, said relay having a contactor element which closes on energization of said relay to connect the other terminal of said power source to the common junction of said resistor and said motor so as to apply full power across said motor and to charge said capacitor through said resistor, said relay being such that the acquisition of a predetermined charge by said capacitor lowers the potential difference across said control winding sufficiently to deenergize said relay, whereupon said contactor element opens and said capacitor discharges through said resistor and said motor until said potential difference is thereby increased sufficiently to bring about the reclosing of said contactor element, whereupon said capacitor again charges to repeat the successive opening and closing of said contactor element.

5. In a control system for a D. C. motor, a first source of D. C. potential, controllable switching means arranged on closure thereof to connect said first source across said motor, control means responsive to potentials supplied thereto exceeding a first given value for closing said switching means, said control means maintaining said switching means closed when once closed so long as said potentials exceed a second given value less than the first, charging means connected across said motor so as to charge from said first source when said switching means is closed and to discharge through said motor when said switching means is opened, a second source of potential, and circuit means including said control means for coupling said second source to said charging circuit and said motor so that said switching means is thereby closed and the potential supplied to said control means from said second source is reduced by the charge acquired by said charging means from said first source, said switching means opening to discharge said charging means when said supplied potential is reduced by said charge to said second value, said switching means closing when said charging means discharges sufficiently to restore said supplied potential to said first value, whereby said switching means is successively opened and closed to successively connect and disconnect said motor to and from said first source as said charging means respectively charges and discharges.

6. In a control system for a D. C. motor, a first source of D. C. potential, first switching means arranged on closure thereof to connect said first source across said motor, first control means adapted upon energization thereof to close said first switching means and to open the same upon deenergization of said first control means, a second source of potential, second switching means arranged on closure thereof to connect one of said first and second sources to said first control means for energizing the latter, second control means adapted upon energization thereof by a first predetermined potential difference to close said second switching means and to maintain said second switching means closed only for energizing potential differences supplied to said second control means that are above a second predetermined potential difference less than the first, charging means connected across said motor so as to charge from said first source when said first switching means is closed and to discharge through said motor when said first switching means is opened, and circuit means including said second control means for connecting said second source to said charging circuit and said motor so that said first and second switching means are thereby closed and the potential difference derived from said second sourie to energize said second control means is reduced by the charge acquired by said charging means from said first source, said second switching means opening to discharge said charging means when said potential difference is reduced by said charge to said second predetermined value, said second switching means closing when said charging means discharges sufficiently to increase said potential difference to said first predetermined value, whereby said first switching means is successively opened and closed to successively connect and disconnect said motor to and from said first source as said charging means respectively charges and discharges.

7. In a control system for a D. C. motor, a first source of D. C. potential, a first electromagnetic relay including a first switch operable to be closed on energization of the first relay's winding to connect said first source across said motor, a second electromagnetic relay including a second switch operable to be closed on energization of the second relay's winding by a first predetermined potential difference thereacross to connect said first source across said first relay winding to energize the same, said second switch thereafter remaining closed only for potential differences across said second relay winding above a second predetermined potential difference less than the first, a resistor and capacitor connected in series across said motor so that said capacitor is charged through said resistor from said first source when said first switch is closed and is discharged through said resistor and motor when said first switch is opened, a second source of potential, and circuit means including said second relay winding for connecting said second source across said capacitor to close said first and second switches so that the potential difference across said second relay winding derived from said second source is reduced by the charge acquired by said capacitor from said first source, said second switch opening to discharge said capacitor when said potential difference is reduced by said charge to said second predetermined value, said second switch closing when said capacitor discharges sufficiently to increase said potential difference to said first predetermined value, whereby said first switch is successively opened and closed to successively connect and disconnect said motor to and from said first source as said capacitor respectively charges and discharges.

8. In a control system for a D. C. motor, a source of D. C. actuating potential for said motor, controllable switching means operative in first and second senses to respectively connect and disconnect said actuating source to and from said motor, potential storing means connected across said motor so as to charge from said actuating source when said switching means is operated in said first sense and to discharge through said motor when said switching means is operated in said second sense, control means including a thyratron operative upon conduction thereof to control said switching means to operate in said first sense and operative upon non-conduction to control said switching means to operate in said second sense, said thyratron having first and second grid elements, means for applying a preselected alternating potential to the plate of said thyratron, means for connecting said storing means to said first grid element so that the charge acquired by said storing means when said switching means is operated in said first sense is applied in a negative polarity sense to said first grid element, means for applying a preselected positive potential to said second grid element determinative of the magnitude of the stored charge required to prevent said thyratron from conducting on positive half-cycles of said alternating potential, and delaying means for preventing said switching means from being operated in said second sense for a given time after conduction of said thyratron ceases so that said charge gradually builds up to a first potential sufficient to maintain said thyratron non-conductive, whereupon said storing means discharges to a lesser second potential that reinstates thyratron conduction, whereby said motor actuating potential is successively switched on and off as said storing means respectively charges and discharges.

References Cited in the file of this patent

UNITED STATES PATENTS

| | | |
|---|---|---|
| 2,494,107 | Wald | Nov. 16, 1948 |
| 2,495,382 | Morton | Jan. 24, 1950 |
| 2,675,511 | Kutzler | Apr. 13, 1954 |
| 2,675,512 | Ruhland | Apr. 13, 1954 |